(12) United States Patent
Shim

(10) Patent No.: US 7,016,380 B2
(45) Date of Patent: Mar. 21, 2006

(54) MULTI-BEAM LASER SCANNING UNIT

(75) Inventor: Hyeong-seog Shim, Suwon (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 217 days.

(21) Appl. No.: 10/638,488

(22) Filed: Aug. 12, 2003

(65) Prior Publication Data

US 2004/0125427 A1 Jul. 1, 2004

(30) Foreign Application Priority Data

Dec. 30, 2002 (KR) ............... 10-2002-0086842

(51) Int. Cl.
*G02B 27/30* (2006.01)
(52) U.S. Cl. ................... 372/24; 359/641
(58) Field of Classification Search ............ 372/24
See application file for complete search history.

(56) References Cited

U.S. PATENT DOCUMENTS

| 5,319,528 | A | * | 6/1994 | Raven ................ 362/553 |
| 5,680,231 | A | * | 10/1997 | Grinberg et al. ......... 359/15 |
| 5,808,803 | A | * | 9/1998 | Ullmann et al. ......... 359/641 |
| 5,850,310 | A | * | 12/1998 | Schweizer ............ 359/622 |

* cited by examiner

*Primary Examiner*—James Vannucci
(74) *Attorney, Agent, or Firm*—Staas & Halsey LLP

(57) ABSTRACT

A multi-beam laser scanning unit including a plurality of laser diodes arranged in the vertical direction, and a plurality of collimating lens units having collimating lenses, which are arranged in the laser beam optical path in order to convert laser beams emitted from each of the laser diodes into linear beams. The collimating lens units are arranged in a manner such that adjacent collimating lens units are partly overlapped in the laser beam scanning direction. Each of the collimating lenses has a different focal length.

31 Claims, 6 Drawing Sheets

210

MULTI-BEAM LASER SCANNING UNIT

CROSS-REFERENCE TO RELATED APPLICATIONS

This application claims the benefit of Korean Application No. 2002-86842, filed Dec. 30, 2002, in the Korean Intellectual Property Office, the disclosure of which is incorporated herein by reference.

BACKGROUND OF THE INVENTION

1. Field of the Invention

The present invention generally relates to a laser scanning unit for an image forming apparatus and more specifically, to a multi-beam laser scanning unit used in a color image forming apparatus.

2. Description of the Related Art

A laser scanning unit forms an electrostatic latent image on the surface of a photoconductive device, by scanning a laser beam to the photoconductive device. FIG. 1 illustrates a conventional laser scanning unit 10.

As shown in FIG. 1, the conventional laser scanning unit 10 includes a laser diode 11 to emit a laser beam, a collimating lens 12 to make the emitted laser beam parallel with regard to an optical axis, and a cylindrical lens 13 to change the parallel beam into a horizontal linear beam. The laser scanning unit 10 further includes a polygonal mirror 14 to reflect the horizontal linear beam within predetermined angles at a constant rate. The laser scanning unit 10 also has an Fθ lens 15 having a given refractive index with respect to another optical axis, which focuses the beam on a scanning surface by refracting the beam reflected at the constant rate from the polygonal rotating mirror 14 in a main scanning direction and adjusting for any aberration. The laser scanning unit 10 also includes a reflection mirror 16 to reflect the laser beam from the Fθ lens 15 in a predetermined direction, thereby making the beam be incident on the surface of a photoconductive drum 0, i.e., the scanning surface.

Meanwhile, the conventional image forming apparatus is provided with a plurality of the photoconductive drums $O_1$, $O_2$, $O_3$, $O_4$ to which developers with different colors adhere for color printing. Such an image forming apparatus includes a multi-beam laser scanning unit with a plurality of laser light sources in order to form a latent image on the respective photoconductive drum $O_1$, $O_2$, $O_3$, $O_4$. In FIG. 2, the conventional multi-beam laser scanning unit 100 is shown.

As shown in FIG. 2, the conventional multi-beam laser scanning unit 100 includes a laser light source unit 110 to emit laser beams corresponding to respective photoconductive drums $O_1$, $O_2$, $O_3$, $O_4$, a cylindrical lens 120 to make a plurality of parallel beams emitted from the laser light source unit 110 into horizontal linear beams, and a polygonal rotating mirror 130 to reflect the horizontal linear beam within given angles, and rotate at a constant rate. The laser light source unit 110 includes an Fθ lens 140 having a given refractive index with respect to an optical axis and to refract the beam emitted from the polygonal rotating mirror 130 in a main scanning direction, and a plurality of mirror units 150 to reflect the beams from the Fθ lens 140 to be incident on the surfaces of the respective photoconductive drums $O_1$, $O_2$, $O_3$, $O_4$.

In the laser light source unit 110, as shown in FIG. 3, arranged adjacent to each other are a plurality of laser diodes 111, 112, 113, 114 to emit laser beams and a plurality of corresponding collimating lens units 115, 116, 117, 118. The respective collimating lens units 115, 116, 117, 118 have collimating lenses 115a, 116a, 117a, 118a and slits 115b, 116b, 117b, 118b.

In the conventional multi-beam laser scanning unit 100, however, the collimating lens units 115, 116, 117, 118 corresponding to the laser diodes 111, 112, 113, 114 are arranged in the vertical direction so that the height of the light source unit 110 increases. Moreover, as the gap between optical axes of laser beams L emitted from each of the laser diodes 111, 112, 113, 114 is broad, the height of parts arranged in the path of the laser beams L increases. As a result, the height $H_1$ of the laser scanning unit 100 is also increased, thereby increasing the size of the image forming apparatus. Further, a motor 131 with a large output is necessary due to the increased height, which results in increased manufacturing costs.

SUMMARY OF THE INVENTION

Accordingly, it is an aspect of the present invention to overcome the above-mentioned and/or other problems of the related art.

It is another aspect of the present invention to provide a less costly and smaller-sized multi-beam laser scanning unit by reducing a gap between a plurality of laser diodes arranged parallel to each other, and between optical axes of the laser beams emitted from each of the laser diodes.

Additional aspects and advantages of the invention will be set forth in part in the description which follows and, in part, will be obvious from the description, or may be learned by practice of the invention.

The foregoing and/or other aspects of the present invention may be achieved by providing a multi-beam light scanning unit including a plurality of laser diodes arranged in a line to emit laser beams; and a plurality of collimating lens units each having a collimating lens, which are arranged in an optical path of the emitted laser beams to convert the emitted laser beams into linear beams, wherein the collimating lens units partly overlap each other in a laser beam scanning direction.

Each of the collimating lenses may have a different focal length so that the respective collimating lens units can focus a laser beam on the same plane.

Each of the collimating lenses may have the same focal length and the plurality of laser diodes may be disposed the same distance from the respective collimating lenses in order for each of the collimating lens units to focus a beam on the same plane.

The foregoing and/or other aspects of the present invention may also be achieved by providing a multi-beam laser scanning unit including first to fourth laser diodes disposed a line; and first to fourth collimating lens units each having a collimating lens to convert a respective one of the emitted laser beams into a linear beam, wherein the collimating lenses of the first and third collimating lens units are disposed in a first plane and have a first focal length, and the collimating lenses of the second and fourth collimating lens units are disposed in a second plane and have a second focal length so that adjacent ones of the collimating lens units are partly overlapped in a laser beam scanning direction.

The surface of the collimating lens may be either spherical or non spherical. Furthermore, the collimating lens may be made of either glass or plastic. Still further, the collimating lens may include a lens with a negative curvature and a lens with a positive curvature.

BRIEF DESCRIPTION OF THE DRAWINGS

These and/or other aspects and advantages of the invention will become apparent and more readily appreciated from the following description of the preferred embodiments, taken in conjunction with the accompanying drawings of which.

DETAILED DESCRIPTION OF THE PREFERRED EMBODIMENTS

Figure 1:
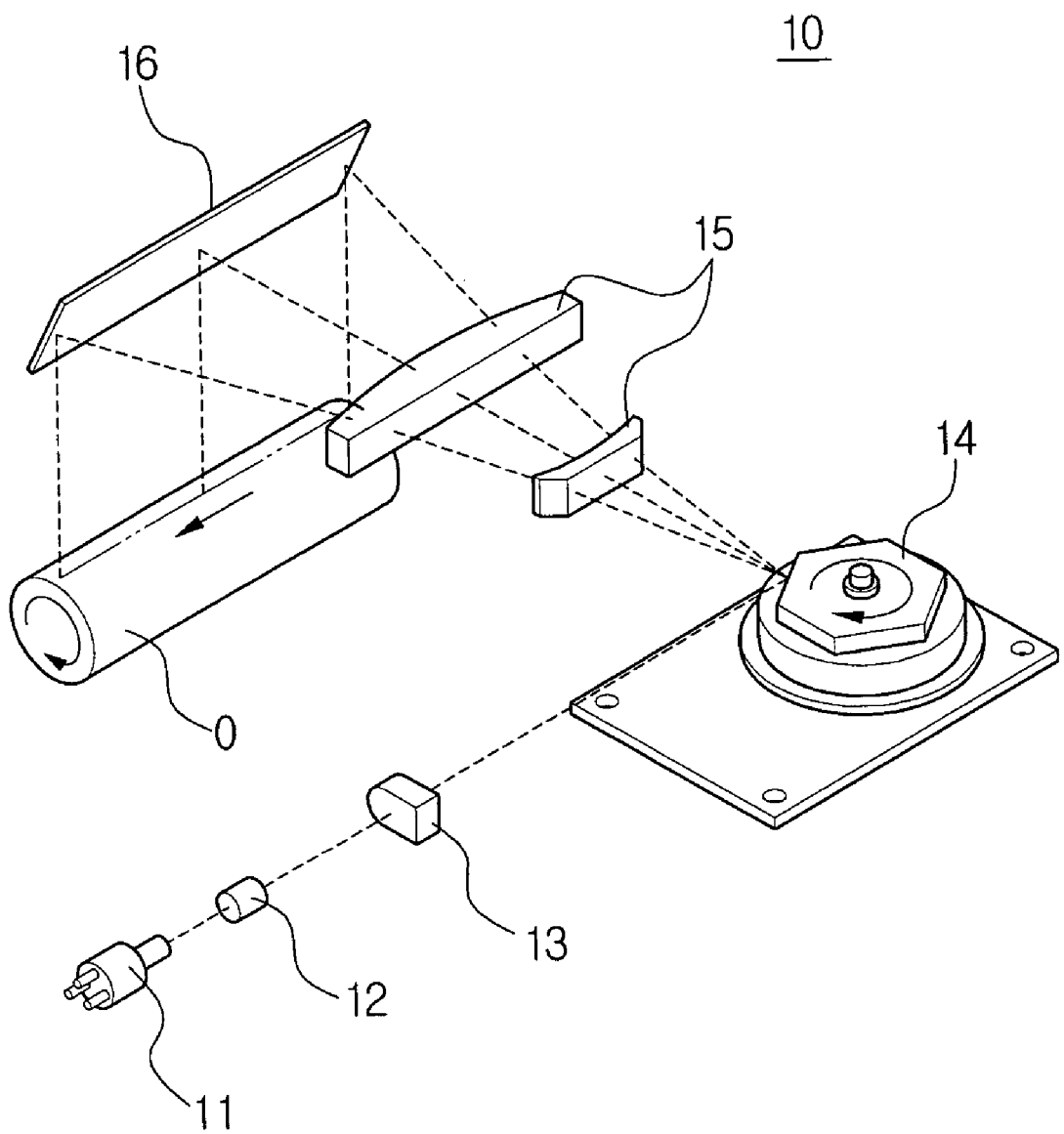
FIG. 1 is a perspective view schematically showing a conventional laser scanning unit.
Figure 2:
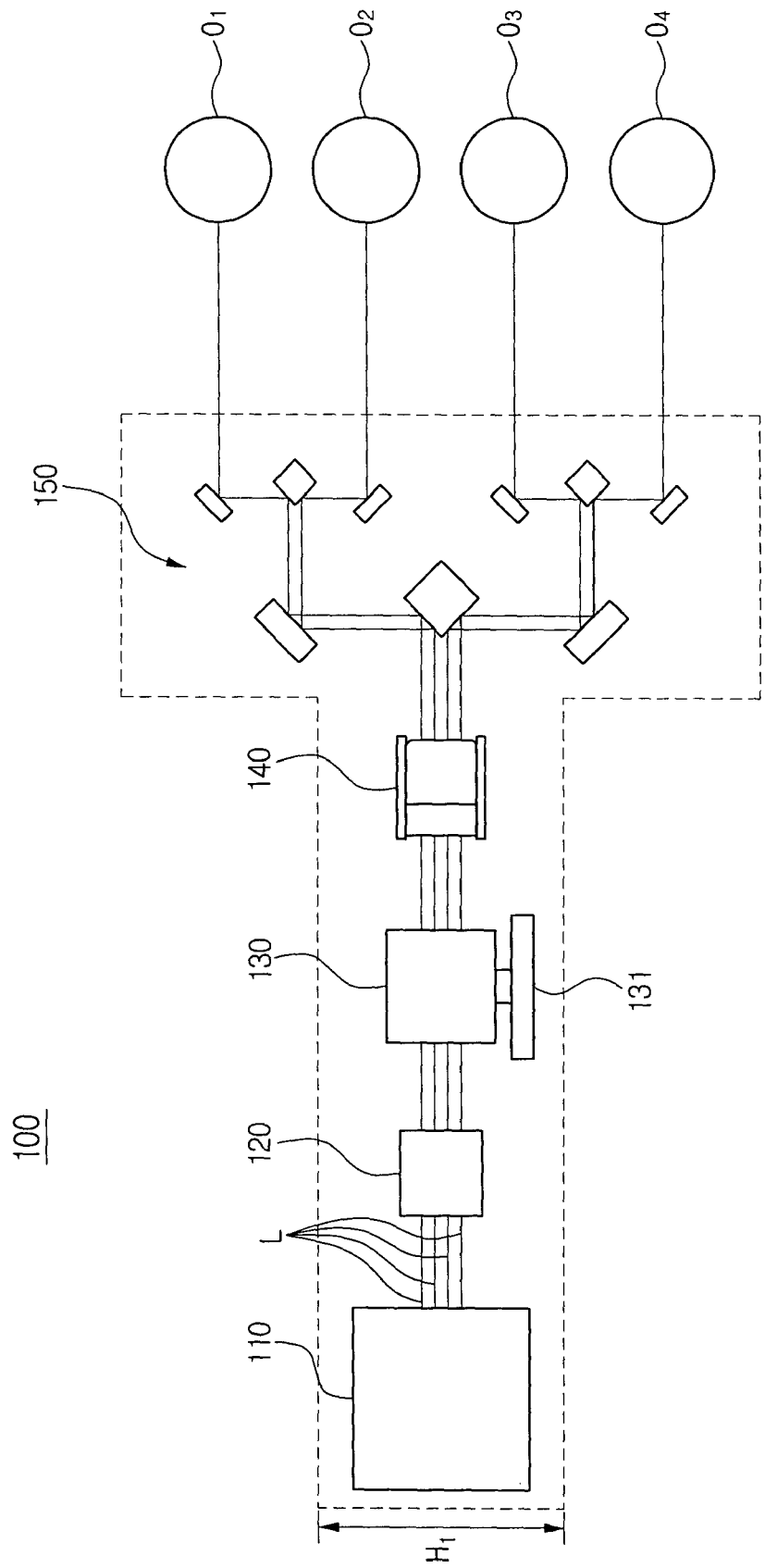
FIG. 2 is a diagram schematically showing the structure of a conventional multi-beam laser scanning unit.
Figure 3:
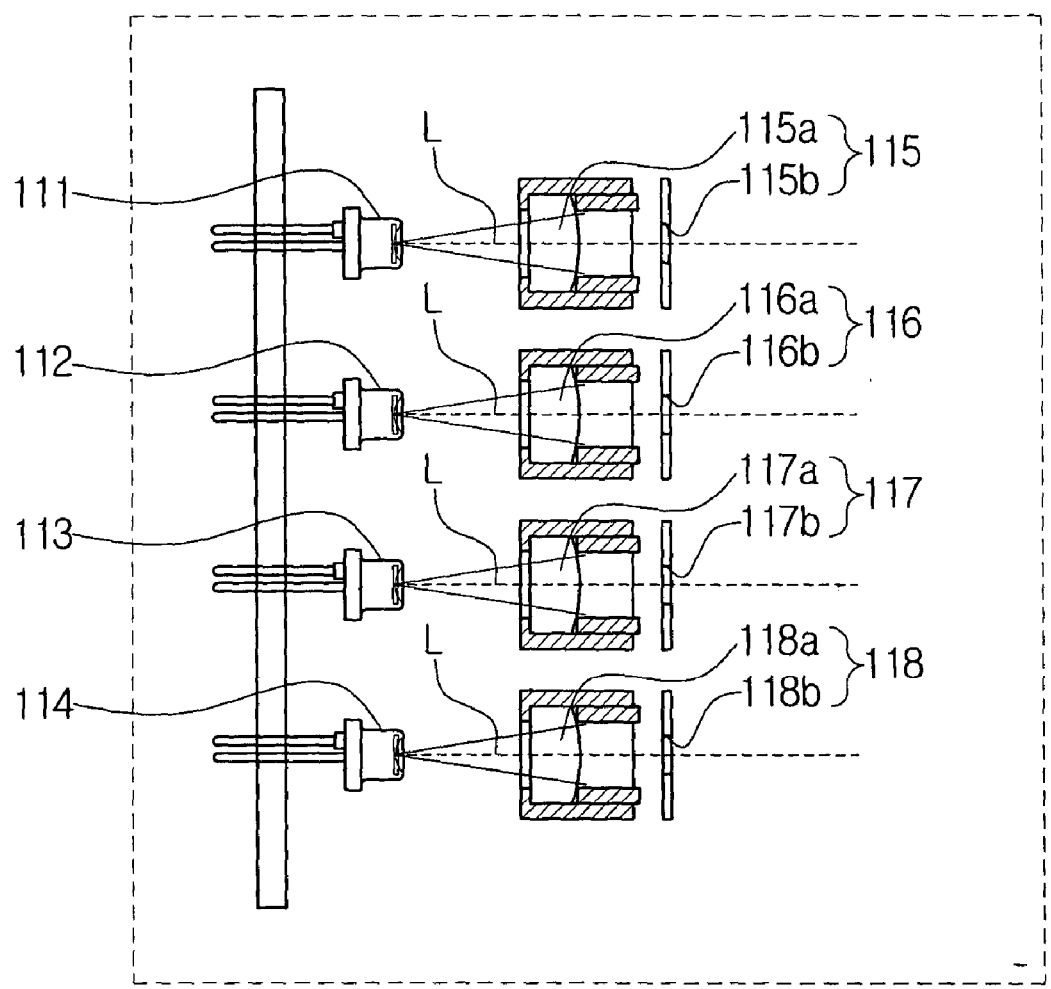
FIG. 3 is a diagram showing a portion of the conventional multi-beam laser scanning unit of FIG. 2.

Reference will now be made in detail to the present preferred embodiments of the present invention, examples of which are illustrated in the accompanying drawings, wherein like reference numerals refer to like elements throughout.

Figure 4:
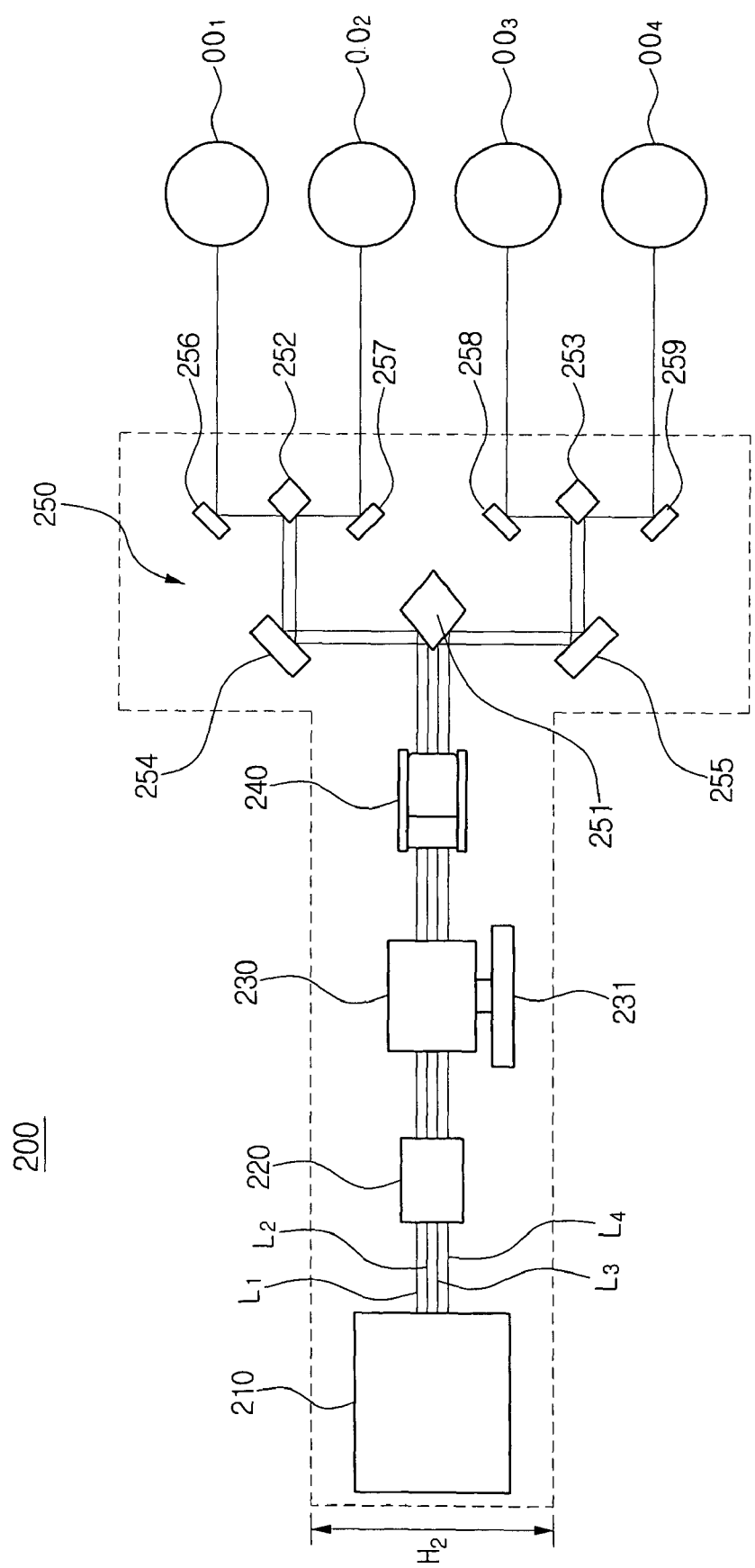
FIG. 4 is a diagram schematically showing the structure of a multi-beam laser scanning unit according to an embodiment of the present invention.
Figure 5:
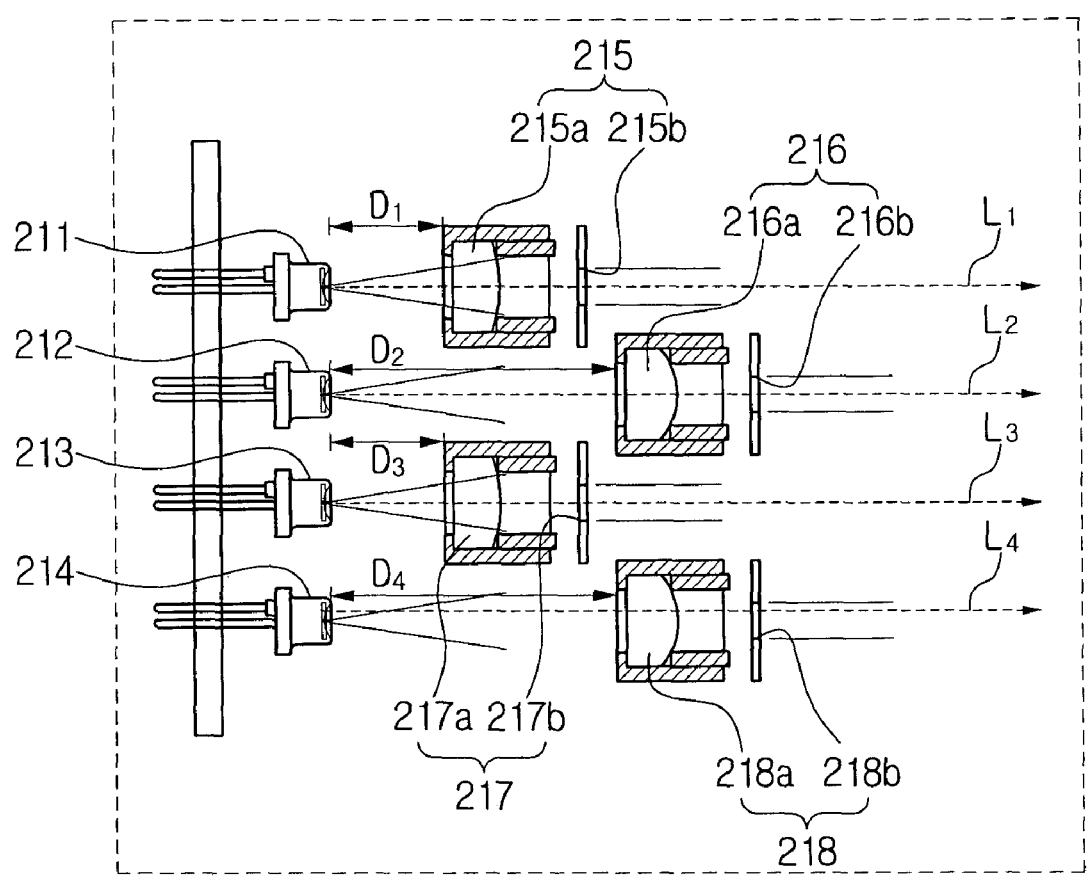
FIG. 5 is a diagram showing a portion of the multi-beam laser scanning unit shown in FIG. 4.

As shown in FIGS. 4 and 5, the multi-beam laser scanning unit 200 according to a first embodiment of the present invention includes a laser light source unit 210, a cylindrical lens 220, a polygonal rotating mirror 230, an Fθ lens 240, and a mirror unit 250.

The laser light source unit 210 has first to fourth laser diodes 211, 212, 213, 214 arranged vertically in a row to be in the same line and first to fourth collimating lens units 215, 216, 217, 218 corresponding to the respective laser diodes 211, 212, 213, 214. The first to fourth collimating lens units 215, 216, 217, 218 respectively have collimating lenses 215a, 216a, 217a, 218a to convert each of laser beams $L_1$, $L_2$, $L_3$, $L_4$ emitted from the respective laser diodes 211, 212, 213, 214 into linear beams. The first to fourth collimating lens units further include slits 215b, 216b, 217b, 218b arranged in front of the collimating lenses 215a, 216a, 217a, 218a in the beam scanning direction.

The respective collimating lens units 215, 216, 217, 218 are arranged to partially overlap with each other in the beam scanning direction. In other words, parts of the first and second collimating lens units 215, 216, the second and third collimating lens units 216, 217, and the third and fourth collimating lens units 217, 218 are overlapped. As a result, the distance between the first collimating lens unit 215 and the fourth collimating lens unit 218 can be shortened, and the laser light source unit 210 can also be shortened in height.

The distance $D_1$ between the first laser diode 211 and the first collimating lens unit 215, and the distance $D_3$ between the third laser diode 213 and the third collimating lens unit 217 are the same. So are the distance $D_2$ between the second laser diode 212 and the second collimating lens unit 216, and the distance $D_4$ between the fourth laser diode 214 and the fourth collimating lens unit 218. Therefore, the first and third collimating lens units 215, 217 are positioned on the same plane, perpendicular to each of the laser beams $L_1$, $L_2$, $L_3$, $L_4$. The second and fourth collimating lens units 216, 218 are also positioned on the another plane, perpendicular to the laser beams $L_1$, $L_2$, $L_3$, $L_4$.

Each of the collimating lenses 215a, 216a, 217a, 218a formed inside each of the collimating lens units 215, 216, 217, 218 has a respective focal length. In other words, the first collimating lens 215a and the third collimating lens 217a have the same focal length, and the second collimating lens 216a and the fourth collimating lens 218a have a shorter focal length than the first collimating lens 215a and the second collimating lens 216a. Consequently, the laser beams $L_1$, $L_2$, $L_3$, $L_4$ emitted from each of the laser diodes 211, 212, 213, 214 can be focused on the same plane perpendicular to the laser beams $L_1$, $L_2$, $L_3$, $L_4$ after passing through the respective collimating lens units 215, 216, 217, 218.

The surface of the respective collimating lenses 215a, 216a, 217a, 218a can be either spherical or not spherical and include lenses with negative curvature or positive curvature. Plus, the respective collimating lenses 215a, 216a, 217a, 218a can be made of either glass or plastic.

After the laser beams $L_1$, $L_2$, $L_3$, $L_4$ pass through the collimating lens units 215, 216, 217, 218, the cylindrical lens 220 converts each of the laser beams $L_1$, $L_2$, $L_3$, $L_4$ into a linear beam. As shown in FIG. 4, the cylindrical lens 220 is large enough for the laser beams $L_1$, $L_4$ emitted respectively from the first laser diode 211 and the fourth laser diode 214 to pass.

The polygonal rotating mirror 230 has a plurality of reflective surfaces and is rotated by a motor 231 and reflects linear beams received from the cylindrical lens 220 at predetermined angles at a constant rate, thereby each of the linear beams is scanned onto the surface of photoconductive drums $OO_1$, $OO_2$, $OO_3$, $OO_4$, respectively.

The Fθ lens 240 has a constant refractive index with respect to the optical axes of each of the laser beams $L_1$, $L_2$, $L_3$, $L_4$. The Fθ lens 240 refracts the laser beams $L_1$, $L_2$, $L_3$, $L_4$ reflected from the polygonal rotating mirror 230, and focuses each of the laser beams $L_1$, $L_2$, $L_3$, $L_4$ on the scanning surfaces of the photoconductive drums $OO_1$, $OO_2$, $OO_3$, $OO_4$, respectively, by adjusting an aberration of the beams.

The mirror unit 250 divides each of the laser beams $L_1$, $L_2$, $L_3$, $L_4$ emitted parallel to each other from the Fθ lens 240 and reflects the divided beams toward each of the photoconductive drums $OO_1$, $OO_2$, $OO_3$, $OO_4$, respectively. The mirror unit 250 includes first, second and third division mirrors 251, 252, 253 and first to sixth reflective mirrors 254, 255, 256, 257, 258, 259.

In the multi-beam laser scanning unit 200 described above, the collimating lens units 215, 216, 217, 218 are positioned to be partly overlapped with each other so that the respective laser diodes 211, 212, 213, 214 are closer and thus, the gap between each of the laser beams $L_1$, $L_2$, $L_3$, $L_4$ becomes narrower. As a result, the cylindrical lens 220, the polygonal rotating lens 230, and the Fθ lens 240, which are formed in the optical path, become shorter, and consequently, the multi-beam laser scanning unit 200 becomes smaller than the conventional multi-beam laser scanning unit 100 in height ($H_2 < H_1$).

Each of the laser beams $L_1$, $L_2$, $L_3$, $L_4$ emitted from the first to fourth laser diodes 211, 212, 213, 214 is converted into parallel beams after passing through the first to fourth collimating lens units 215, 216, 217, 218, respectively. Each of the laser beams $L_1$, $L_2$, $L_3$, $L_4$ having the same luminosity is incident on the cylindrical lens 220 after passing through the collimating lens units 215, 216, 217, 218, each of which has the respective focal lengths and distances corresponding to each of the laser diodes 211, 212, 213, 214.

Each of the laser beams $L_1, L_2, L_3, L_4$ from the cylindrical lens 220 is converted into parallel linear beams and then, is reflected by the polygonal rotating mirror 230 in the right or left direction within the predetermined angles. Each of the laser beams $L_1, L_2, L_3, L_4$ reflected from the polygonal rotating mirror 230 passes through the Fθ lens 240 and then, is incident parallel on the first division mirror 251. After being incident on the first division mirror 251, the first and second laser beams $L_1, L_2$ are reflected to the first reflective mirror 254, and the third and fourth laser beams $L_3, L_4$ are reflected to the second reflective mirror 255.

Among the first to fourth laser beams $L_1, L_2, L_3, L_4$ incident parallel on the first division mirror 251, the first and second laser beams $L_1, L_2$ are reflected to the first reflective mirror 254, and the third and fourth laser beams $L_3, L_4$ are reflected to the second reflective mirror 255. The first and second laser beams $L_1, L_2$ incident on the first reflective mirror 254 are reflected to the second division mirror 252 and then, the first laser beam $L_1$ is again reflected to the third reflective mirror 256 by the second division mirror 252. The second laser beam $L_2$ is again reflected to the fourth reflective mirror 257.

Moreover, the third and fourth laser beams $L_3, L_4$ incident on the second reflective mirror 255 are reflected to the third division mirror 253 and then, the third laser beam $L_3$ is again reflected to the fifth reflective mirror 258 by the third division mirror 253, and the fourth laser beam $L_4$ is again reflected to the sixth reflective mirror 259. Lastly, each of the laser beams $L_1, L_2, L_3, L_4$ reflected to the third to sixth reflective mirrors 256, 257, 258, 259 is again reflected to the first to fourth photoconductive drums $OO_1, OO_2, OO_3, OO_4$, respectively, to form electrostatic latent images on the respective photoconductive drums $OO_1, OO_2, OO_3, OO_4$.

Figure 6:
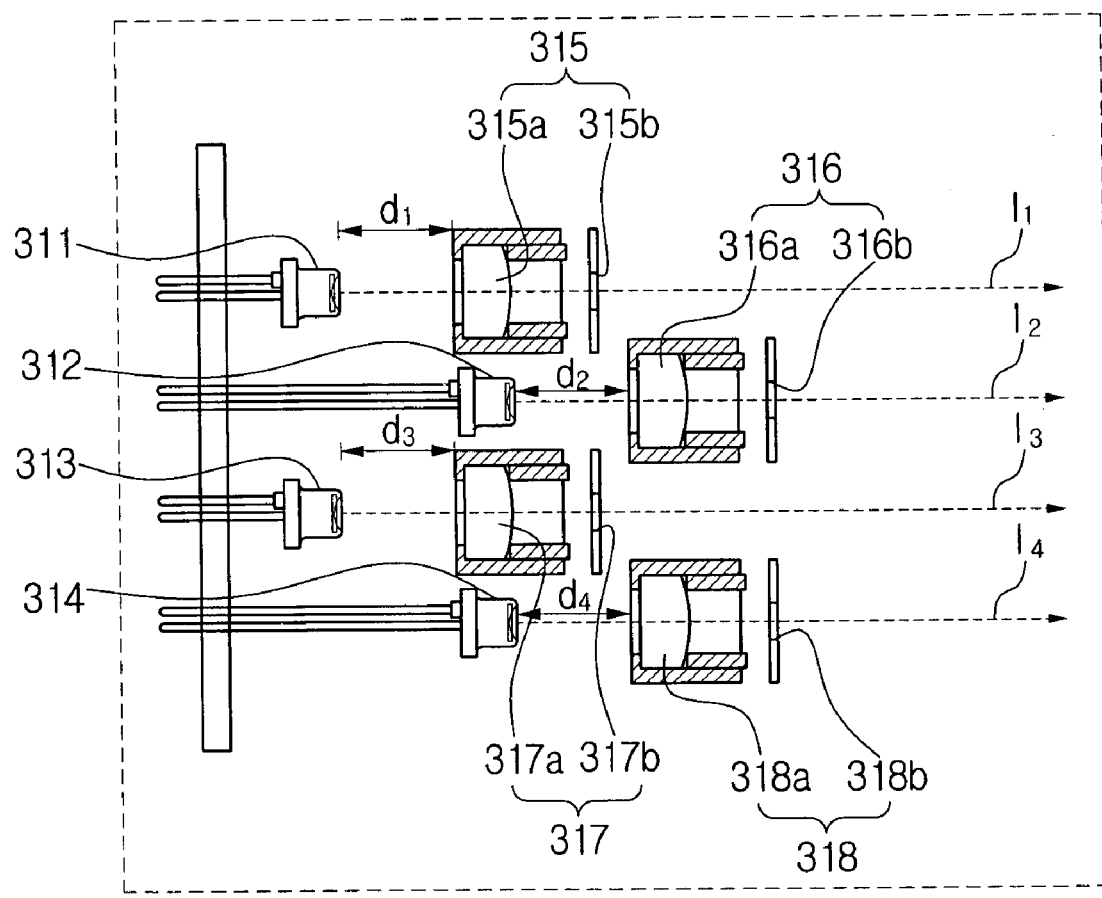
FIG. 6 is a diagram showing a portion of the multi-beam laser scanning unit according to another embodiment of the present invention.

A multi-beam laser scanning unit according to the second embodiment of the present invention, as shown in FIG. 6, has a laser light source unit 310. The multi-beam laser scanning unit also includes a cylindrical lens, a polygonal rotating mirror, an Fθ lens and a mirror unit which are not separately illustrated, but are similar to those shown in FIG. 4.

The laser light source unit 310 has a plurality of laser diodes 311, 312, 313, 314 and corresponding collimating lens units 315, 316, 317, 318. The collimating lens units 315, 316, 317, 318 respectively include collimating lenses 315a, 316a, 317a, 318a having the same focal length, and slits 315b, 316b, 317b, 318b arranged in front of the collimating lenses 315a, 316a, 317a, 318a. The respective collimating lens units 315, 316, 317, 318 are partly overlapped, as seen from the beam scanning starting point. Therefore, the gap between each of the collimating lens units 315, 316, 317, 318 and each of the laser diodes 311, 312, 313, 314 can be reduced, and the laser light source unit 310 can also be reduced in height. Since each of the laser diodes 311, 312, 313, 314 is arranged the same distance $d_1, d_2, d_3, d_4$ from the respective collimating lens units 315, 316, 317, 318, laser beams $I_1, I_2, I_3, I_4$ from the respective collimating lens units 315, 316, 317, 318 can be incident on the cylindrical lens at the same luminosity.

According to the first embodiment of the present invention as described above, since the plurality of the collimating lens units 215, 216, 217, 218 are arranged to be partly overlapped with each other, the gap between the respective collimating lens units 215, 216, 217, 218 is reduced, and so is the gap between each of the laser diodes 211, 212, 213, 214 and between the laser beams $L_1, L_2, L_3, L_4$ emitted from the respective laser diodes 211, 212, 213, 214. Consequently, the size of each of the parts arranged along the optical path from the laser diodes 211, 212, 213, 214 to the mirror unit 250 becomes smaller, thereby the height $H_2$ of the multi-beam scanning unit 200 is smaller than the height $H_1$ of the conventional multi-beam laser scanning unit 100. Thus, the size of the image forming apparatus can be reduced.

Particularly, the polygonal rotating mirror 230 operating at high speed, which is arranged in the optical path, can be reduced in height so that the motor 231 of a low output to drive the polygonal mirror 230 can be used, thereby lessening manufacturing costs.

Although a few embodiments of the present invention have been shown and described, it will be appreciated by those skilled in the art that changes may be made in these embodiments without departing from the principles and spirit of the invention, the scope of which is defined in the claims and their equivalents.

What is claimed is:

1. A multi-beam laser scanning unit comprising:
   a plurality of laser diodes arranged to emit laser beams; and
   a plurality of collimating lens units each having a collimating lens, which are arranged in an optical path of the emitted laser beams to convert the emitted laser beams into linear beams, wherein the collimating lens units partly overlap each other in a laser beam scanning direction.

2. The multi-beam laser scanning unit of claim 1, wherein the collimating lenses have a plurality of focal lengths and each of the collimating lens units focuses a respective one of the laser beams on a same surface.

3. The multi-beam laser scanning unit of claim 2, wherein each of the collimating lenses has a spherical surface.

4. The multi-beam laser scanning unit of claim 2, wherein each of the collimating lenses has a non-spherical surface.

5. The multi-beam laser scanning unit of claim 2, wherein each of the collimating lenses is made of glass.

6. The multi-beam laser scanning unit of claim 2, wherein each of the collimating lenses is made of plastic.

7. The multi-beam laser scanning unit of claim 2, wherein each of the collimating lenses comprises a first lens with a negative curvature and a second lens with a positive curvature.

8. The multi-beam laser scanning unit of claim 1, wherein each of the collimating lenses has a same focal length, and the plurality of laser diodes are disposed a same distance from the respective collimating lenses and the collimating lens units to focus the respective emitted laser beams on a same surface.

9. The multi-beam laser scanning unit of claim 8, wherein the collimating lenses each have a spherical surface.

10. The multi-beam laser scanning unit of claim 8, wherein the collimating lenses each have a non-spherical surface.

11. The multi-beam laser scanning unit of claim 8, wherein the collimating lenses are each made of glass.

12. The multi-beam laser scanning unit of claim 8, wherein the collimating lenses are each made of plastic.

13. The multi-beam laser scanning unit of claim 8, wherein the collimating lenses each comprise a lens having a negative curvature and a lens having a positive curvature.

14. A multi-beam laser scanning unit comprising:
   first to fourth laser diodes disposed to emit a laser beam; and first to fourth collimating lens units each having a collimating lens to convert a respective one of the emitted laser beams into a linear beam, wherein the collimating lenses of the first and third collimating lens units are disposed in a first plane and have a first focal length, and the collimating lenses of the second and fourth collimating lens units are disposed in a second plane and have a second focal length, so that adjacent ones of the collimating lens units are partly overlapped in a laser beam scanning direction.

15. The multi-beam scanning unit of claim 14, wherein a surface of the collimating lenses is spherical.

16. The multi-beam scanning unit of claim 14, wherein a surface of the collimating lenses is non-spherical.

17. The multi-beam scanning unit of claim 14, wherein the collimating lenses are made of glass.

18. The multi-beam scanning unit of claim 14, wherein the collimating lenses are made of plastic.

19. The multi-beam scanning unit of claim 14, wherein the collimating lenses each comprises a lens with a negative curvature and a lens with a positive curvature.

20. An apparatus comprising:

first and second laser units displaced relative to each other in a first direction to emit first and second laser beams in a second direction perpendicular to the first direction, the first and second laser units also being displaced relative to each other in the second direction; and first and second lens units each respectively disposed a same distance from the first and second laser units to respectively receive the first and second laser beams and convert the received first and second laser beams to first and second linear beams, wherein the first and second lens units partially overlap each other in the first direction.

21. The apparatus of claim 20, wherein the first direction is a laser scanning direction.

22. The apparatus of claim 20, further comprising:

third and fourth laser units respectively arranged in the first direction with respect to the first and second laser units to respectively emit third and fourth laser beams; and third and fourth lens units to respectively receive the third and fourth laser beams and convert the received third and fourth laser beams to third and fourth linear beams, wherein the third and fourth lens units overlap each other in the first direction, and the second and third lens units overlap each other in the first direction.

23. The apparatus of claim 20, wherein the first and second lens units each comprise:

a collimating lens to convert the received laser beam to the linear beam; and a slit receive the linear beam.

24. An apparatus comprising:

first and second laser units arranged in a first direction to emit first and second laser beams in a second direction; and first and second lens units to respectively receive the first and second laser beams and convert the received first and second laser beams to first and second linear beams, wherein the first and second lens units partially overlap each other in the first direction, wherein the first and second laser units are displaced relative to each other in the second direction.

25. The apparatus of claim 24, wherein a focal length of the first and second lens units is the same.

26. The apparatus of claim 24, wherein a distance between the first laser unit and the first lens unit is the same as a distance between the second laser unit and the second lens unit.

27. An apparatus comprising:

first and second laser units arranged in a first direction to emit first and second laser beams in a second direction;

first and second lens units to respectively receive the first and second laser beams and convert the received first and second laser beams to first and second linear beams, wherein the first and second lens units partially overlap each other in the first direction;

third and fourth laser units arranged in the first direction to respectively emit third and fourth laser beams; and third and fourth lens units to respectively receive the third and fourth laser beams and convert the received third and fourth laser beams to third and fourth linear beams, wherein the third and fourth lens units overlap each other in the first direction, and the second and third lens units overlap each other in the first direction, and the first and third laser units are arranged in a first line in the first direction, and the second and fourth laser units are arranged in a second line in the first direction, displaced in the second direction relative to the first line.

28. The apparatus of claim 27, wherein a distance between the first laser unit and the first lens unit is the same as a distance between the third laser unit and the third lens unit.

29. The apparatus of claim 28, wherein a distance between the second laser unit and the second lens unit is the same as a distance between the fourth laser unit and the fourth lens unit.

30. The apparatus of claim 29, wherein the first lens unit and the third lens unit have a same focal length, and the second lens unit and the fourth lens unit have a focal length shorter than the focal length of the first and third lens units.

31. An apparatus comprising:

first and second laser units arranged in a first direction to emit first and second laser beams in a second direction;

first and second lens units to respectively receive the first and second laser beams and convert the received first and second laser beams to first and second linear beams, wherein the first and second lens units partially overlap each other in the first direction;

third and fourth laser units arranged in the first direction to respectively emit third and fourth laser beams; and third and fourth lens units to respectively receive the third and fourth laser beams and convert the received third and fourth laser beams to third and fourth linear beams, wherein the third and fourth lens units overlap each other in the first direction, and the second and third lens units overlap each other in the first direction, and, the first and third lens units are arranged in a first line in the first direction, and the second and fourth lens units are arranged in a second line in the first direction, displaced in the second direction relative to the first line.

* * * * *